United States Patent
Zhang et al.

(10) Patent No.: US 10,032,454 B2
(45) Date of Patent: *Jul. 24, 2018

(54) SPEAKER AND CALL CHARACTERISTIC SENSITIVE OPEN VOICE SEARCH

(71) Applicant: Nuance Communications, Inc., Burlington, MA (US)

(72) Inventors: Shilei Zhang, Beijing (CN); Shenghua Bao, Beijing (CN); Wen Liu, Beijing (CN); Yong Qin, Beijing (CN); Zhiwei Shuang, Beijing (CN); Jian Chen, Beijing (CN); Zhong Su, Beijing (CN); Qin Shi, Beijing (CN); William F. Ganong, III, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/750,000

(22) Filed: Jun. 25, 2015

(65) Prior Publication Data
US 2015/0294669 A1     Oct. 15, 2015

Related U.S. Application Data

(63) Continuation of application No. 14/152,136, filed on Jan. 10, 2014, now Pat. No. 9,099,092, which is a
(Continued)

(51) Int. Cl.
*G10L 15/00*     (2013.01)
*G10L 15/04*     (2013.01)
(Continued)

(52) U.S. Cl.
CPC ........ *G10L 15/26* (2013.01); *G06F 17/30026* (2013.01); *G06F 17/3053* (2013.01);
(Continued)

(58) Field of Classification Search
CPC ........ H04L 29/08072; G06F 17/30864; G06Q 30/02; G06Q 10/10; H05K 999/99;
(Continued)

(56) References Cited

U.S. PATENT DOCUMENTS 5,960,397 A * 9/1999 Rahim ................ G10L 15/20
                                                                          704/233
6,029,195 A * 2/2000 Herz ................ G06F 17/30867
                                                                          348/E7.056
(Continued)

*Primary Examiner* — Anne L Thomas-Homescu
(74) *Attorney, Agent, or Firm* — Banner & Witcoff, Ltd.

(57) ABSTRACT

Techniques disclosed herein include systems and methods for open-domain voice-enabled searching that is speaker sensitive. Techniques include using speech information, speaker information, and information associated with a spoken query to enhance open voice search results. This includes integrating a textual index with a voice index to support the entire search cycle. Given a voice query, the system can execute two matching processes simultaneously. This can include a text matching process based on the output of speech recognition, as well as a voice matching process based on characteristics of a caller or user voicing a query. Characteristics of the caller can include output of voice feature extraction and metadata about the call. The system clusters callers according to these characteristics. The system can use specific voice and text clusters to modify speech recognition results, as well as modifying search results.

16 Claims, 6 Drawing Sheets

Related U.S. Application Data continuation of application No. 13/039,467, filed on Mar. 3, 2011, now Pat. No. 8,630,860.

(51) Int. Cl.

| | |
|---|---|
| *G10L 15/20* | (2006.01) |
| *G10L 15/18* | (2013.01) |
| *G10L 15/28* | (2013.01) |
| *G10L 15/14* | (2006.01) |
| *G10L 15/06* | (2013.01) |
| *G10L 17/00* | (2013.01) |
| *G10L 25/00* | (2013.01) |
| *G10L 21/06* | (2013.01) |
| *G10L 21/00* | (2013.01) |
| *G10L 19/02* | (2013.01) |
| *G06F 17/27* | (2006.01) |
| *G06F 17/21* | (2006.01) |
| *G10L 15/26* | (2006.01) |
| *G06F 17/30* | (2006.01) |
| *G10L 15/22* | (2006.01) |
| *G10L 15/183* | (2013.01) |

(52) U.S. Cl.
CPC .. *G06F 17/30705* (2013.01); *G06F 17/30867* (2013.01); *G10L 15/18* (2013.01); *G10L 15/22* (2013.01); *G10L 15/183* (2013.01); *G10L 15/1807* (2013.01)

(58) Field of Classification Search
CPC ....... G10L 15/22; G10L 15/16; G10L 15/265; G10L 15/08; G10L 15/063; G10L 15/187
See application file for complete search history.

(56) References Cited

U.S. PATENT DOCUMENTS

| | | | | |
|---|---|---|---|---|
| 6,460,036 B1* | 10/2002 | Herz | ................ | G06F 17/30867 348/E7.056 |
| 7,027,987 B1* | 4/2006 | Franz | ................ | G10L 15/22 704/236 |
| 7,464,031 B2* | 12/2008 | Axelrod | ................ | G10L 15/063 704/236 |
| 7,603,360 B2* | 10/2009 | Ramer | ................ | G06F 17/3087 |
| 7,639,898 B1* | 12/2009 | Chan | ................ | G06Q 10/10 382/181 |
| 7,657,523 B2 | 2/2010 | Ebanks | | |
| 7,725,318 B2* | 5/2010 | Gavalda | ................ | G06F 17/30684 704/245 |
| 7,725,319 B2* | 5/2010 | Aronowitz | ................ | G10L 15/02 704/253 |
| 7,761,464 B2 | 7/2010 | Radlinski et al. | | |
| 7,844,466 B2* | 11/2010 | Roy | ................ | G10L 15/1822 704/200 |
| 8,005,680 B2 | 8/2011 | Kommer | | |
| 8,122,021 B2 | 2/2012 | White et al. | | |
| 8,126,714 B2* | 2/2012 | Hanazawa | ................ | G10L 15/197 704/231 |
| 8,484,098 B2 | 7/2013 | Bilotta | | |
| 8,484,191 B2* | 7/2013 | Maghoul | ................ | G06F 17/30867 707/707 |
| 8,504,561 B2 | 8/2013 | Hoad et al. | | |
| 8,515,736 B1* | 8/2013 | Duta | ................ | G10L 15/1822 704/9 |
| 8,560,324 B2* | 10/2013 | Shin | ................ | G06F 3/167 704/231 |
| 8,661,030 B2 | 2/2014 | Ei-Saban et al. | | |
| 8,843,481 B1 | 9/2014 | Xu | | |
| 8,868,579 B2 | 10/2014 | Arora | | |
| 2002/0095295 A1* | 7/2002 | Cohen | ................ | H04M 3/493 704/275 |
| 2003/0110038 A1 | 6/2003 | Sharma et al. | | |
| 2003/0182310 A1* | 9/2003 | Charnock | ................ | G06F 17/30716 |
| 2004/0210443 A1* | 10/2004 | Kuhn | ................ | G10L 15/22 704/276 |
| 2005/0055210 A1* | 3/2005 | Venkataraman | ................ | G10L 15/183 704/255 |
| 2005/0182628 A1* | 8/2005 | Choi | ................ | G10L 15/08 704/252 |
| 2005/0187771 A1* | 8/2005 | Gong | ................ | G10L 15/142 704/256.6 |
| 2006/0161434 A1* | 7/2006 | Faisman | ................ | G10L 15/22 704/246 |
| 2006/0248059 A1* | 11/2006 | Chi | ................ | G06F 17/30867 |
| 2007/0005570 A1* | 1/2007 | Hurst-Hiller | ................ | G06F 17/30654 |
| 2007/0061314 A1* | 3/2007 | Rosenberg | ................ | G06F 17/30864 |
| 2007/0124134 A1* | 5/2007 | Van Kommer | ................ | G06Q 30/02 704/10 |
| 2007/0208569 A1* | 9/2007 | Subramanian | ................ | G10L 19/0018 704/270 |
| 2007/0266025 A1* | 11/2007 | Wagner | ................ | G06F 17/30867 |
| 2008/0027921 A1* | 1/2008 | Chandrasekar | ................ | G06F 17/3087 |
| 2008/0028036 A1* | 1/2008 | Slawson | ................ | G06F 17/30867 709/217 |
| 2008/0071544 A1* | 3/2008 | Beaufays | ................ | G06F 17/30867 704/270.1 |
| 2008/0104032 A1* | 5/2008 | Sarkar | ................ | G06F 17/3089 |
| 2008/0154870 A1* | 6/2008 | Evermann | ................ | G06F 17/30867 |
| 2008/0177708 A1* | 7/2008 | Ayyar | ................ | G06F 17/30899 |
| 2008/0183706 A1* | 7/2008 | Dong | ................ | G06F 17/30976 |
| 2008/0214149 A1* | 9/2008 | Ramer | ................ | G06Q 30/06 455/414.1 |
| 2009/0043573 A1* | 2/2009 | Weinberg | ................ | G10L 17/06 704/223 |
| 2009/0077122 A1* | 3/2009 | Fume | ................ | G06F 17/3064 |
| 2009/0100047 A1* | 4/2009 | Jones | ................ | G06F 17/30648 |
| 2009/0150156 A1* | 6/2009 | Kennewick | ................ | G06Q 30/0261 704/257 |
| 2009/0204408 A1* | 8/2009 | Simpson | ................ | G06Q 10/087 704/273 |
| 2009/0259475 A1* | 10/2009 | Yamagami | ................ | G10L 13/10 704/276 |
| 2009/0313019 A1* | 12/2009 | Kato | ................ | G10L 17/26 704/254 |
| 2010/0010994 A1* | 1/2010 | Wittig | ................ | G06F 17/30165 707/E17.039 |
| 2010/0030560 A1* | 2/2010 | Yamamoto | ................ | 704/257 |
| 2010/0041958 A1* | 2/2010 | Leuthardt | ................ | G06F 19/3481 600/300 |
| 2010/0198825 A1* | 8/2010 | Chan | ................ | G06Q 30/0263 707/736 |
| 2010/0262612 A1* | 10/2010 | El-Saban | ................ | G06F 17/30864 707/752 |
| 2011/0004462 A1* | 1/2011 | Houghton | ................ | G10L 15/183 704/9 |
| 2011/0004473 A1* | 1/2011 | Laperdon | ................ | G10L 15/02 704/243 |
| 2011/0060587 A1* | 3/2011 | Phillips | ................ | G10L 15/30 704/235 |
| 2011/0137653 A1* | 6/2011 | Ljolje | ................ | G10L 15/183 704/255 |
| 2011/0144995 A1* | 6/2011 | Bangalore | ................ | G06F 17/30637 704/251 |
| 2011/0191372 A1* | 8/2011 | Kaushansky | ................ | G06Q 30/02 707/776 |
| 2011/0231396 A1* | 9/2011 | Dhara | ................ | H04L 12/1818 707/731 |
| 2011/0301953 A1* | 12/2011 | Lee | ................ | G10L 15/187 704/243 |
| 2011/0320191 A1* | 12/2011 | Makeyev | ................ | G06Q 30/02 704/9 |
| 2011/0320201 A1* | 12/2011 | Kaufman | ................ | G10L 17/04 704/251 |
| 2011/0320441 A1* | 12/2011 | Lee | ................ | G06F 17/30867 707/723 |
| 2012/0069131 A1* | 3/2012 | Abelow | ................ | G06Q 10/067 348/14.01 |
| 2012/0072219 A1* | 3/2012 | Johnston | ................ | G06F 17/30979 704/251 |

(56) References Cited

U.S. PATENT DOCUMENTS

| | | | |
|---|---|---|---|
| 2012/0084277 A1* | 4/2012 | Barve | G06F 17/30864 707/708 |
| 2012/0203779 A1* | 8/2012 | Reisman | G06F 17/30648 707/732 |
| 2012/0233212 A1* | 9/2012 | Newton | G06Q 30/02 707/774 |
| 2012/0259636 A1* | 10/2012 | Sejnoha | G06F 17/30976 704/235 |
| 2013/0046538 A1* | 2/2013 | Harrington | G10L 15/26 704/235 |
| 2013/0090928 A1* | 4/2013 | Rose | G10L 15/08 704/249 |
| 2013/0097166 A1* | 4/2013 | Fink | G06Q 30/02 707/737 |
| 2013/0124495 A1* | 5/2013 | Sejnoha | G06F 17/30637 707/707 |
| 2013/0138428 A1* | 5/2013 | Chandramouli | G06F 17/274 704/9 |
| 2014/0250145 A1* | 9/2014 | Jones | G06Q 10/101 707/769 |

\* cited by examiner

SPEAKER AND CALL CHARACTERISTIC SENSITIVE OPEN VOICE SEARCH

RELATED APPLICATIONS

This application is a continuation of and claims priority to U.S. patent application Ser. No. 14/152,136, filed Jan. 10, 2014, which is a continuation of U.S. patent application Ser. No. 13/039,467, filed Mar. 3, 2011, both of which are fully incorporated by reference.

BACKGROUND

The present disclosure relates to speech recognition. The present disclosure also relates to information retrieval systems for executing searches and, more specifically, voice-enabled searches.

Voice-enabled searching, also referred to as voice search, allows individuals to use a voice command or voice query to search the Internet and/or electronic devices. A voice search is a search executed using a spoken query or spoken utterance. Such voice searching typically involves converting a spoken utterance into text, such as by converting spoken words, numbers and characters into a text string. This text string can then be used to complete a search via an Internet search engine, database lookup, or other information retrieval system. Generally, voice searching can be categorized as a local voice search or an open voice search.

Local voice searching typically involves executing a voice-enabled search within a specific domain. Restricting a voice search to a specific domain can result in search results that are very accurate by virtue of the narrowed search domain. For example, a local voice search can include searching a specific directory assistance service such as a residential telephone listing.

Open voice searching permits open-domain keyword queries on any information available over a communication network. One example of an open-domain keyword search is searching an Internet search engine. Open voice searching has received increased interest from industry, academia, and individuals, because of the rapid expansion of Web and mobile technology. Voice searching can provide a quick and convenient search option, especially for users of wireless and mobile devices.

SUMMARY

Open voice searching is more challenging than a local search or a search within a specific domain. This challenge is due in part to a larger speech recognition space. There exist some experimental systems that attempt to provide an open voice search. For example, Google has added a voice search feature to their Google mobile application available on conventional smart mobile telephones. This voice search feature allows users to attempt to search for anything on the web by speaking search queries. The accuracy of such conventional open voice search applications is less than satisfactory. There are some notable causes of the poor search results from such experimental systems.

One cause of poor search results is a pipeline system architecture. Such pipeline architecture refers to the process of performing speech recognition first, followed by a conventional web search. With such architecture, if the system generates incorrect speech recognition results, then returned search results will almost always be poor regardless of the sophistication of the web search system.

Another cause of poor search results is diversity of a user's information need. Even when the speech recognition engine works perfectly, search results may nevertheless be poor due to wide ranging information needs of individuals, and to the large information space available. In other words, users' intended or desired search results may be different even with the same search term or search string. For example, consider the search query "notebook" that a user speaks as a voice-enabled search. One user may desire search results related to a notebook computer's appearance, whereas a different user may prefer results relating to detailed hardware configurations of the notebook. Additionally, desired search results can vary based on time of day. For example, a user speaking a particular query during business hours might desire business related results, while a user speaking the same search during evening hours might desire entertainment related results.

Current attempts to improve voice-enabled search typically focus on improving speech recognition performance such as by collecting more text and acoustic data to enlarge a speech corpus and thereby provide a more robust language model and acoustic model. In other words, this current attempt primarily aims to achieve higher speech recognition accuracy in an attempt to yield the same results as a conventional search engine text search. Despite any improved speech recognition performance, search results can nevertheless be less than satisfactory due to the diversity of the information need, and the large information space.

Techniques disclosed herein include systems and methods for open-domain voice-enabled searching that is speaker sensitive. Techniques include using speech information and information associated with a spoken query to enhance open voice search results. This includes integrating a textual index with a voice index to support the entire search cycle. Given a voice query, the system can execute two matching processes simultaneously or in parallel. This can include a text matching process based on the output of speech recognition, as well as a voice matching process based on characteristics of a caller or user voicing a query. Characteristics of the caller can include output of voice feature extraction and metadata about the call. The system clusters callers according to these characteristics, and these clusters are used to generate feature weights used to re-order queries. The system uses these factors to help predict both information about the kind of person calling (as voice qualities do), and also information about what a user might be interested in at that moment of the query. A user's interaction log of returned results can be recorded and used to update speaker characteristic classifications.

One embodiment includes a voice search manager that executes a voice search process or system. The voice search manager receives a spoken query. For example, a user speaks a search query captured by a wireless mobile device such as a cell phone. The voice search manager converts the spoken query into a text query using a speech recognition process. This speech recognition process can use an acoustic model and a statistical language model that assigns a score to respective text strings, with the score of each respective text string indicating a probability of correct conversion of the spoken query to the text query. The voice search manager identifies acoustic features of a voice signal corresponding to the spoken query, which identification can occur in parallel to (or simultaneously with) the speech recognition process.

The voice search manager classifies the spoken query into at least one voice cluster based on the identified acoustic features of the voice signal. This voice cluster has (is associated with) a respective language model and a respective text cluster. The voice search manager can re-assign scores to the text strings based on evaluating the text strings with the respective language model of the voice cluster. The text query can then be selected based on the re-assigned scores, thereby improving accuracy of the text conversion of the spoken query.

The voice search manager receives search results from an information retrieval system based on the text query. For example, the text query is run through a search engine and the voice search manager receives corresponding search results. Each respective search result has a ranking indicating a measure of importance relative to other search results. The voice search manager can then modifying rankings of the search results based on evaluating the search results with the respective text cluster of the voice cluster. In other words, the initially ranked search results can be compared with various documents or text strings from the text cluster that are specific to a given speaker or type of speaker, and then the initially ranked search results can be re-ranked or otherwise modified to improve probably accuracy.

The voice search manager can subsequently monitor user interaction with the re-ranked search results, or otherwise acquire a user interaction log of user activity associated with the search results. Data and text strings from such user interaction can be used to update voice clusters and text clusters to further improve system performance.

In addition to using acoustic voice features to classify spoken queries, and, by extension, speakers of the spoken queries into voice clusters, the voice search manager can also evaluate metadata associated with the spoken query and/or speaker to further improve classification, statistical language models, and text clusters.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a spoken query; converting the spoken query into a text query using a speech recognition process, the speech recognition process using a language model that assigns a score to respective text strings, the score of each respective text string indicating a probability of correct conversion of the spoken query to the text query; identifying acoustic features of a voice signal corresponding to the spoken query; classifying the spoken query into at least one voice cluster based on the identified acoustic features of the voice signal, the voice cluster having a respective language model and a respective text cluster; re-assigning scores to the text strings based on evaluating the text strings with the respective language model of the voice cluster, the text query being selected based on the re-assigned scores; receiving search results from an information retrieval system based on the text query, each respective search result having a ranking indicating a measure of importance relative to other search results; and modifying rankings of the search results based on evaluating the search results with the respective text cluster of the voice cluster. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for sake of clarity. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting voice-enabled search applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for open-domain voice-enabled searching that is speaker sensitive. Techniques include using speech information, speaker information, and information associated with a spoken query to enhance open voice search results. This includes integrating a textual index with a voice index to support the entire search cycle. Given a voice query, the system can execute two matching processes simultaneously or in parallel with each other. This can include a text matching process based on the output of speech recognition, as well as a voice matching process based on characteristics of a caller or user voicing a query. Characteristics of the caller can include output of voice feature extraction and metadata about the call. The system clusters callers according to these characteristics, and these clusters are used to generate feature weights used to order queries. Thus, because a speaker's voice is recorded, the system can estimate a speaker's classification. The system uses these factors to help predict both information about the kind of person calling (as voice qualities do), and also information about what a given user might be interested in at that moment of the query.

Figure 1:
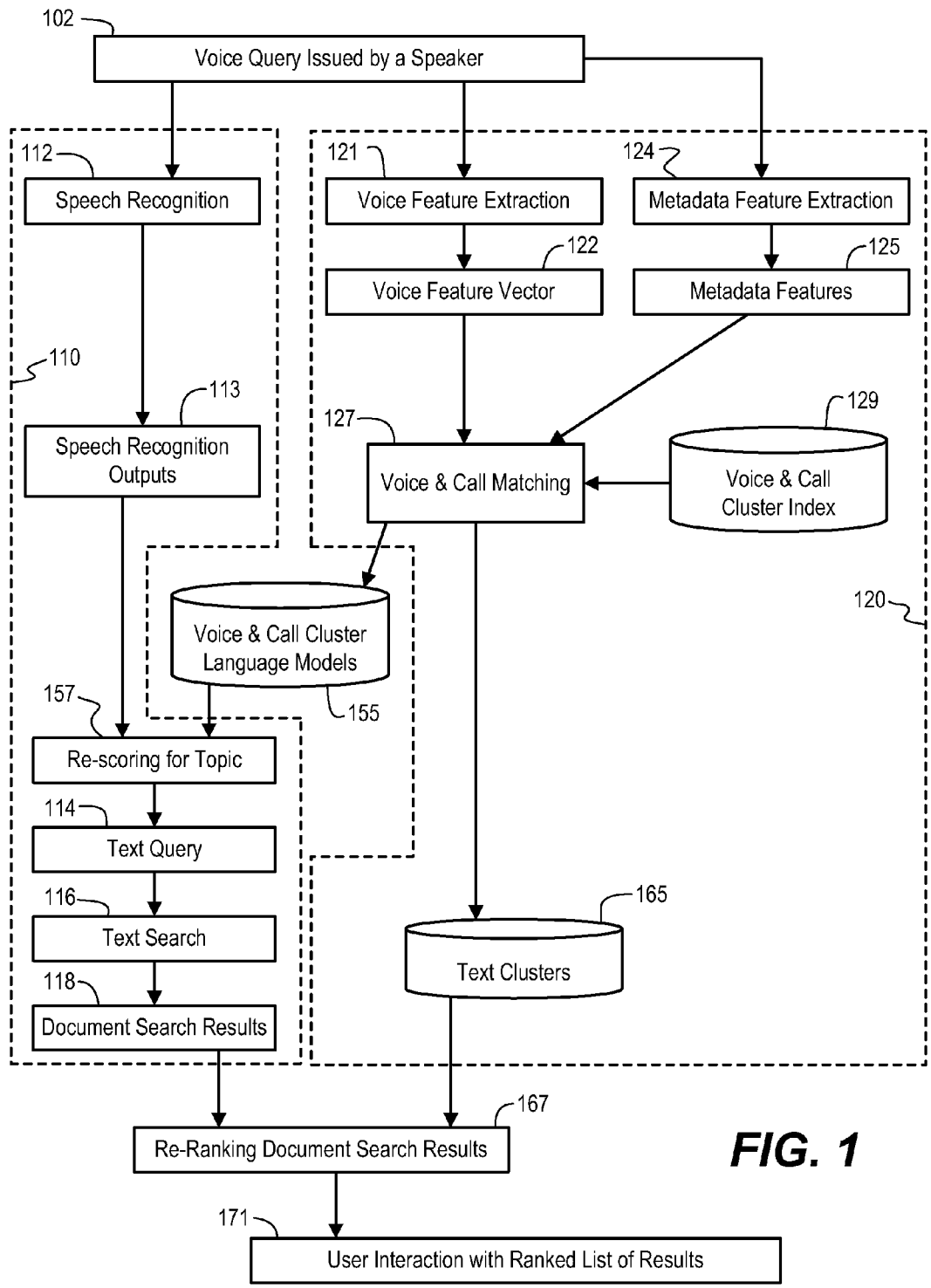
FIG. 1 is a block diagram of a system for voice-enabled search according to embodiments herein.

Referring now to FIG. 1, a block diagram illustrates a general architecture of the system and process. Input 102 to the system is a voice query or spoken utterance issued by a speaker. This speaker could be a caller of a mobile telephone, operator of a desktop computer, driver operating a vehicle computer system, user of a wireless tablet computer, etc. Receiving a spoken query input 102 is then followed by two parallel processes. For convenience in understanding the system, the first process is outlined by area 110, while the second process is outlined by area 120.

The first process 110 includes a conventional speech recognition process 112. This speech recognition process analyzes the spoken query to generate a text output 113. In other words, the speech recognition process converts the utterance/spoken query into a textual representation of the spoken query. This text query output 114 (text representation of the spoken query 102) can subsequently be used in a conventional search engine text search 116 to acquire a set of document search results 118.

The second process or second part 120 includes a voice and call cluster model. The system extracts voice acoustic features and metadata feature information. Then the spoken query can be classified into a specific voice and call cluster 127. After such classification and clustering, the system can then retrieve a corresponding interaction and history log. Associated cluster information can then influence the overall process/system output in two ways. A first way is by modifying/improving speech recognition results, and another way is by improving search engine results. For example, the system can use language models corresponding to a specific voice and metadata cluster to directly improve speech recognition results by re-scoring speech recognition results 157 with cluster specific language models. Regarding search engine results, text log information can be used to re-rank search results 167 based on computing similarities between two documents and text clusters 165.

Now more specifically, the speech recognitions processes 110 can be embodied as a conventional speech recognition engine using a statistical language model and an acoustic model. A language model is used to identify word sequences that are more common than other sequences, which means certain word sequences should be recognized more often. The system runs a speech query through the speech recognizer first, and receives a set of outputs. From the outputs the speech recognizer (speech engine) can select a best or most accurate text conversion for use with a search engine query. Alternatively, the speech recognizer can wait for a re-scoring operation before selecting a particular output for use with the search engine query. After identifying what voice cluster the spoken query belongs to, the system executes a re-ranking of the text outputs, or otherwise modifies the ranking of text outputs.

The system can now use the voice cluster information to access a modified language model that is better suited to the corresponding speaker and/or spoken query. In other words, the system can use classification information to select a language model customized to the spoken query. Using such a modified or specific language model to re-evaluate initial text outputs will result in a more accurate word string. The accuracy of the text query can be higher using the voice and data cluster language models because the specific cluster language model typically reflects the user's characteristics and the correct query results are apt to be a higher probability and more likely to be recognized correctly. The modified language model associates probabilities of word sequences. An associated text cluster then includes the words from spoken queries used for creating that voice cluster. Note that the initial or conventional speech recognition language model and the cluster specific language model can include the same words, but because the cluster specific language model reflects a user's characteristics (what those users often speak or query), there is a higher probability for correct query results. These text strings can be a group of calls/queries made by users within the cluster. This can include all searches made by within that particular cluster, that is, the text queries for executing searches. By way of a non-limiting example, the system identifies that old men talk about features and young men talk about movies, or whatever other differences there are among the population. Differences can include a difference in wording for saying the same thing.

In addition to cluster specific language models, the system can create and use cluster specific acoustic models.

The voice feature processes 120 include voice feature extraction 121 that can result in identifying voice feature vectors 122. This involves speaker clustering/classification technology. The system can cluster speakers based on various acoustic voice features, such as like or similar sounding voices. This can include identifying voice feature vectors. Voice feature vectors can represent acoustic voice characteristics of a query for a given period of time within the spoken query. Such vectors can represent pitch, frequency, speed and other acoustic characteristics. Such feature extraction focuses on acoustic aspects that reveal who a speaker is or is like, instead of the words being said. Spoken queries can then be grouped based on like features, whether or not these features include binary classification such as age or gender. Voice feature extraction can be executed using a mixture model or probabilistic model, such as a Gaussian Mixture Model, that analyzes an electronic voice signal.

In addition to voice feature extraction, the system can also extract metadata features 124 and compile a set of metadata features 125. Metadata feature extraction involves extracting any data available about a speaker without using the sound of the speaker; that is, information about how a voice sounds. Such metadata can include any amount of data that can be extracted from a phone or other device without (or apart from) the voice signal. By way of a specific example, if the speaker were executing a voice-enabled search from a cell phone, then data that may be available can include phone model, area code, geographic location, time of today, etc. When a voice search is executed from the operating system of a mobile device, there is typically a set of user data available. The area code of the calling telephone can be used to help with regional word choices and interests. By knowing a phone number, the system can assume that previous calls from this phone number were from the same person, and so the system can therefore conclude that this same person asking about a particular set of things will ask about similar topics. The geographic location of the phone when a call was made can be used both for a very broad geographic range, (e.g., is the person in Montana or New York), or for very specific locations. Thus, there can be multiple levels of location with different granularity (e.g., is the person in an airport, in a restaurant, traveling by road, and so forth). This can be important because a spoken query coming from a moving vehicle may desire different results than a query spoken from within a residential address. The time of day when the call was made can be useful to help identify search topic trends that vary by time of day. In general, people ask different types of questions in search engines at different times of the day. For example, during 9:00 to 5:00 (relative to a time zone) the questions might be more serious and business related, between 6:00 to 9:00 the questions might be less serious and/or entertainment related. And then after midnight the questions may be even less businesslike. These factors help predict both information about the kind of person calling (as voice qualities do) and information about what the caller might be interested in at that moment.

With voice and metadata features extracted, the system can classify or match (127) the spoken query into at least one specific category or cluster for the voice query. Voice and call clusters, as well as topic clusters, can be stored in an index 129 or other data store. Classification involves selecting a cluster that is most accurate for a given voice query. This cluster selection will identify which language model to use and which text cluster to use in the lower steps. These language models can be created beforehand based on call clustering and associated bodies of text. For metadata clusters, the system can determine topic clusters based on some rules about predefined call characteristics, such as location of the call, time of the call, etc.

Creating the voice and call cluster index can be an automated, manual, or semi-automated process. Generally speaking, there are two methods for setting up the speaker cluster: supervised classification and unsupervised clustering.

With supervised classification, the system can predefine the speaker class such as old female, young female, girl, old male, young male, specific accent, noisy, quiet, and so forth. Then the system can cluster audio data according to these predefined classes via manual classification, and then train a respective language model for each cluster respectively. In other words, for supervised classification a person would need to listen to many calls and then manually classify calls/queries based on the person's perception of acoustic features.

Alternatively, an unsupervised clustering algorithm can be used to analyze and cluster speakers according to differences or deviations in acoustic voice characteristics. At the same time a user is classified into a specific cluster, a speaker's interaction log can be added to that respective cluster to be used to update characteristic classifications. Because the linkage log reflects the information of the user, the update can be an incremental process. Unsupervised clustering essentially involves clustering like sounding voices. For example, the system accesses a corpus of spoken utterances and separates those utterances based on which speakers sound like other speakers. Note that the unsupervised classification may not result in the system knowing which speakers have which accent, or what gender a speaker is, nevertheless, the system identifies and groups speakers having a similar accent, pitch, speed, etc., and recognizes acoustic differences for grouping speakers with like differences. A number of groups or separations can be a predetermined amount, or a function of a specified amount of deviation between acoustic features. Thus, automatic clustering identifies or groups speakers by differences in the way they speak. The resulting groups can be used to create customized language models. Unsupervised clustering can function as an iterative process to separate calls into groups based on automatically identified differences in acoustic features. Unsupervised clustering can include a predefined measure of separation between calls to result in clusters of a predefined level of distinction. Unsupervised clustering can then result in separating calls into just a handful of clusters, or into dozens or hundreds of clusters. That is, the level of distinction between clusters can be predetermined to maximize the distinction between clusters.

The unsupervised and supervised clustering can also be used in conjunction with each other. For example, after generating clustering results from unsupervised clustering, a user can listen to sample calls from clusters and then assign labels. Alternatively the user can listen to an initial seed portion of spoken queries to create an initial set of clusters, and then the algorithm can analyze those clusters and add to those clusters by automatically analyzing voice signals from additional voice queries. Clustering can be hard clustering or soft clustering in that a given spoken voice query can be assigned or grouped to a single cluster, or can span a several clusters.

With an index of voice and call clusters established, and a given spoken query input classified or matched to a voice cluster at least based on extracted voice features, the system can then enhance voice-enabled search in at least two ways.

The system can use a specific voice cluster, call cluster, and associated modified language model (155) to improve speech recognition results. The system accesses initial text outputs 113 of the speech recognition process 112. The system then re-scores the initial text outputs based on the modified language model. The outcome may be that the initial most probable text output is most correct, or that a different text output is more likely the correct text conversion of the spoken query. Thus, the initially scored speech recognition results are re-scored based on the voice and call cluster language models. This topic re-scoring can then generate additional text queries or enhanced text queries, which may identify a more likely text query, thereby improving speech recognition accuracy.

The system can also improve search results directly. After receiving the voice and call cluster information, the system can use this information to re-rank the search results in the text search process thereby providing improved or enhanced search results. Executing a text search 116, using the selected text query 114, returns a set of results or documents that fit the query. This text search can be executed locally, or by using a third party search system, such as a web-based search engine. The search results can include a relative ranking indicating a probability of a correct match or some type of relevance value. The system then analyzes these initial search results based on text cluster data associated with the voice and call cluster. The analysis evaluates how likely it would be for a speaker classified within this cluster to be searching for this particular document. The system, upon analysis of the ranked search results using the cluster data, can then re-rank document search results and return or display these results to a user. The system can then monitor or receive data corresponding to user interaction with the re-ranked search results.

Figure 2:
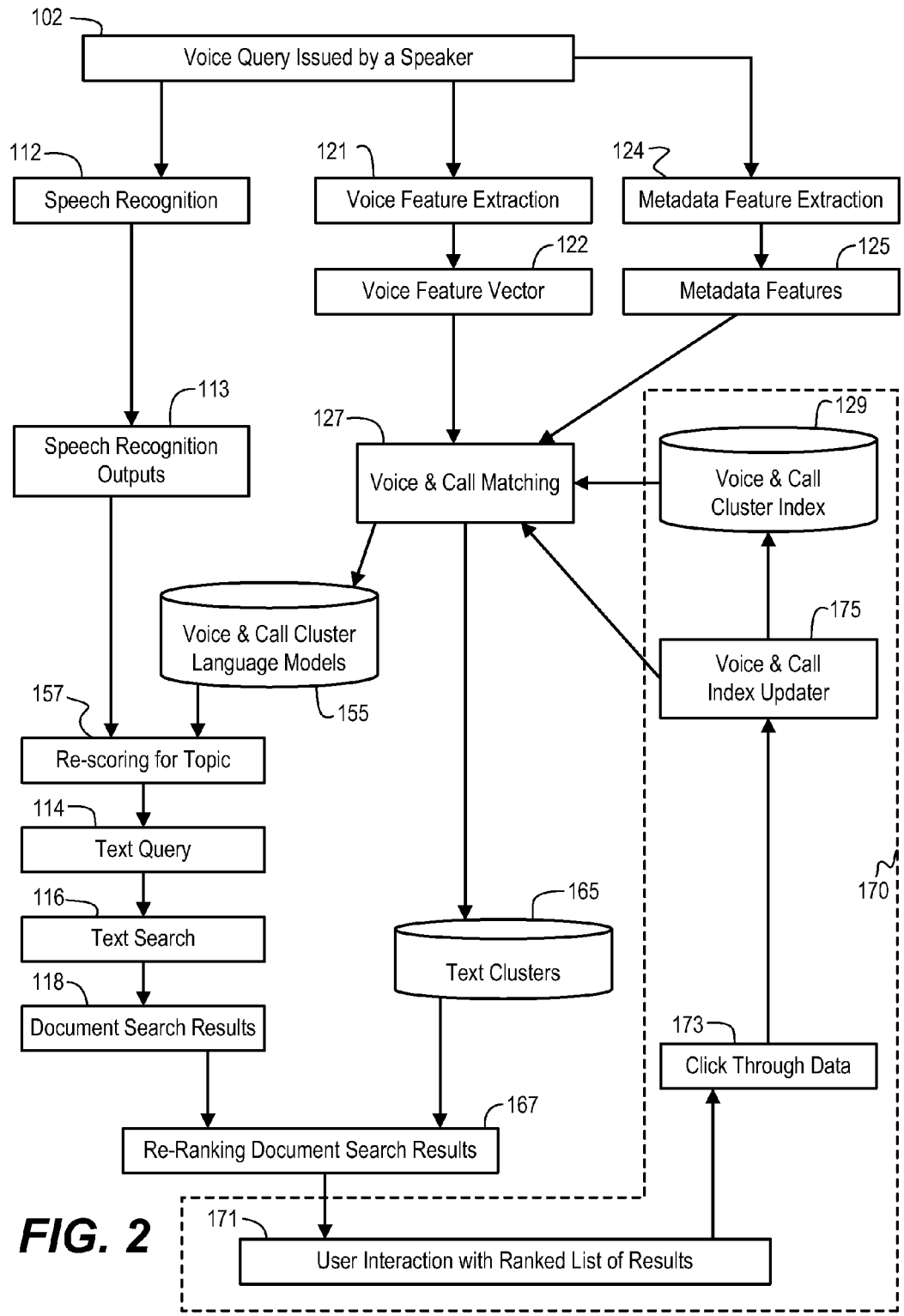
FIG. 2 is a block diagram of a system for voice-enabled search according to embodiments herein.

FIG. 2 is similar to FIG. 1, but identifies an updating process 170. As noted above, the system can monitor user interaction with the ranked or re-ranked results (171), or receive a user interaction log. The user interaction log can include click-through data 173. This click-through data can be sent to a voice and call index updater 175, which can then augment text clusters and improve language models incrementally.

By way of a non-limiting example voice-enabled search of a specific spoken query using a given embodiment, consider that there happens to exist a singing group named "The Tomatoes." This group happens to be followed particularly by young Bostonian women. Also consider for this example that in Austin, Tex., a local favorite food is chili, and that it is very important to get the right variety of tomatoes for the best tasting chili, especially among older men. Now, a given user accesses the voice recognition system and speaks the query "I want to know about the tomatoes" or "tell me about the tomatoes." For this example spoken query, consider that the speech recognition portion accurately recognized the spoken query (initially) and converted this spoken query into text. Consider that the voice search system might include one cluster composed primarily of older men from the Austin area who regularly search on topics related to chili and tomatoes. The voice search system might also include a cluster composed primarily of younger female speakers from the Boston area who regularly search about music and musical bands. The initial search results then return several documents about tomatoes.

By identifying a voice and call cluster, the system can access text clusters associated with queries from that cluster. The particular voice cluster selected can be based on extracted acoustic voice features of the spoken query. For example, the acoustic voice features may have similarities with older male speakers from Texas, or younger female speakers from Boston in this example. The system can identify that a particular cluster either identifies tomatoes as associated with the particular singing group or with the fruit. Subsequently, the system re-ranks the search results depending on which of those voice clusters was matched to the spoken query. This is then one of the ways that text clusters can influence the voice-enabled search.

Another way that the text cluster can influence the voice-enabled search is the situation when the speech recognition (initial recognition) is not as clear or accurate as desired, and so there are more competing hypotheses. In such a situation, information about what this kind of person likes might have more influence. For example, if the caller had a southern drawl, then the caller might be more likely to say Austin, whereas if the person had a Bostonian accent, then they may be more likely to say Boston. Different language models would give different re-scores of speech recognition results depending on what voice cluster was matched to the acoustic voice features of the speaker. The system essentially can shift a probability distribution toward the words said by speakers in a particular cluster.

Figure 6:
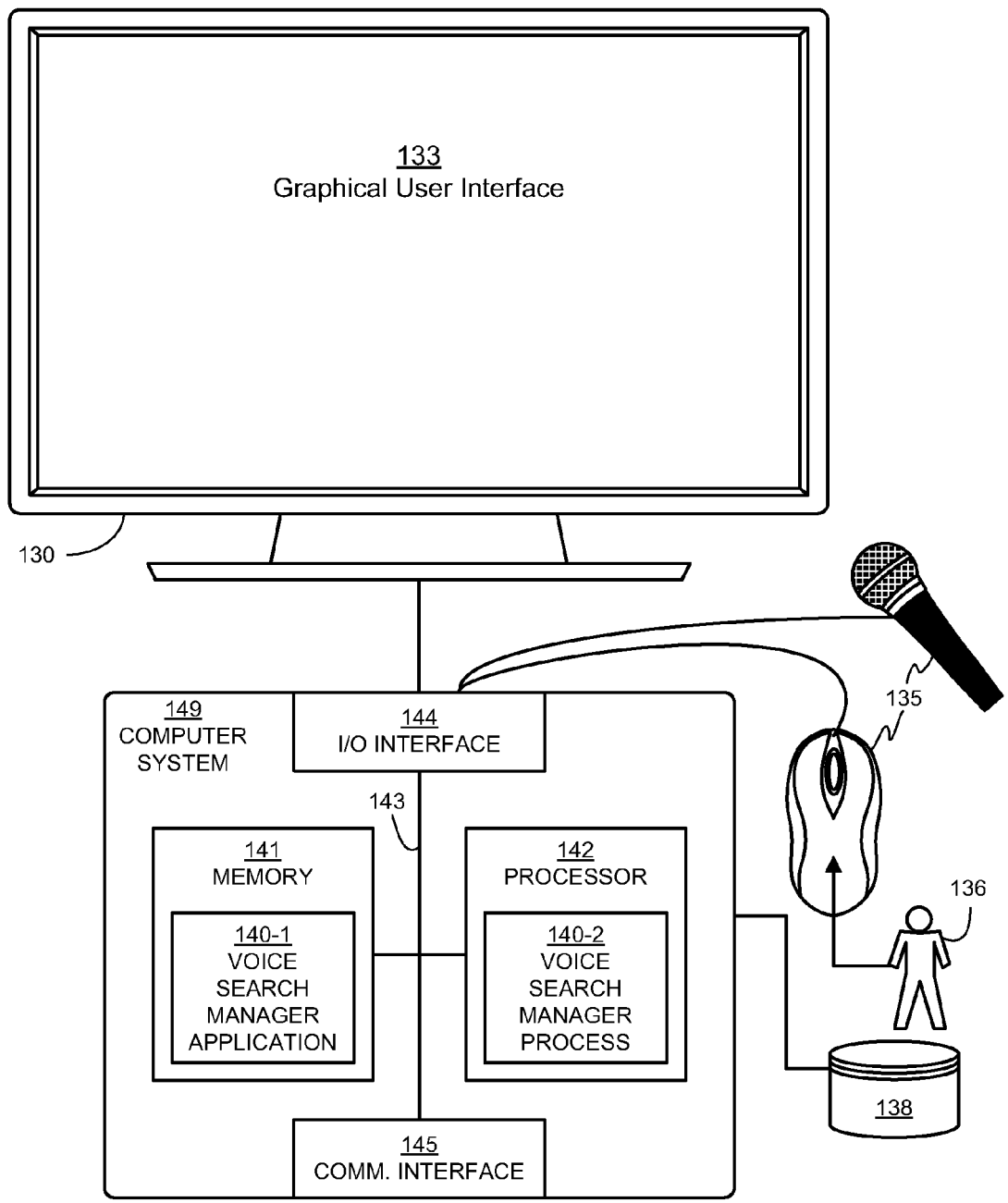
FIG. 6 is an example block diagram of a voice search manager operating in a computer/network environment according to embodiments herein.

FIG. 6 illustrates an example block diagram of a voice search manager 140 operating in a computer/network environment according to embodiments herein. In summary, FIG. 6 shows computer system 149 displaying a graphical user interface 133 that provides an audio data collection interface. Computer system 149 functions as a client device such as a cell phone. Computer system 149 can connect to a remote server for processing assistance. Computer system hardware aspects of FIG. 6 will be described in more detail following a description of the flow charts.

Functionality associated with voice search manager 140 will now be discussed via flowcharts and diagrams in FIG. 3 through FIG. 5. For purposes of the following discussion, the voice search manager 140 or other appropriate entity performs steps in the flowcharts.

Figure 3:
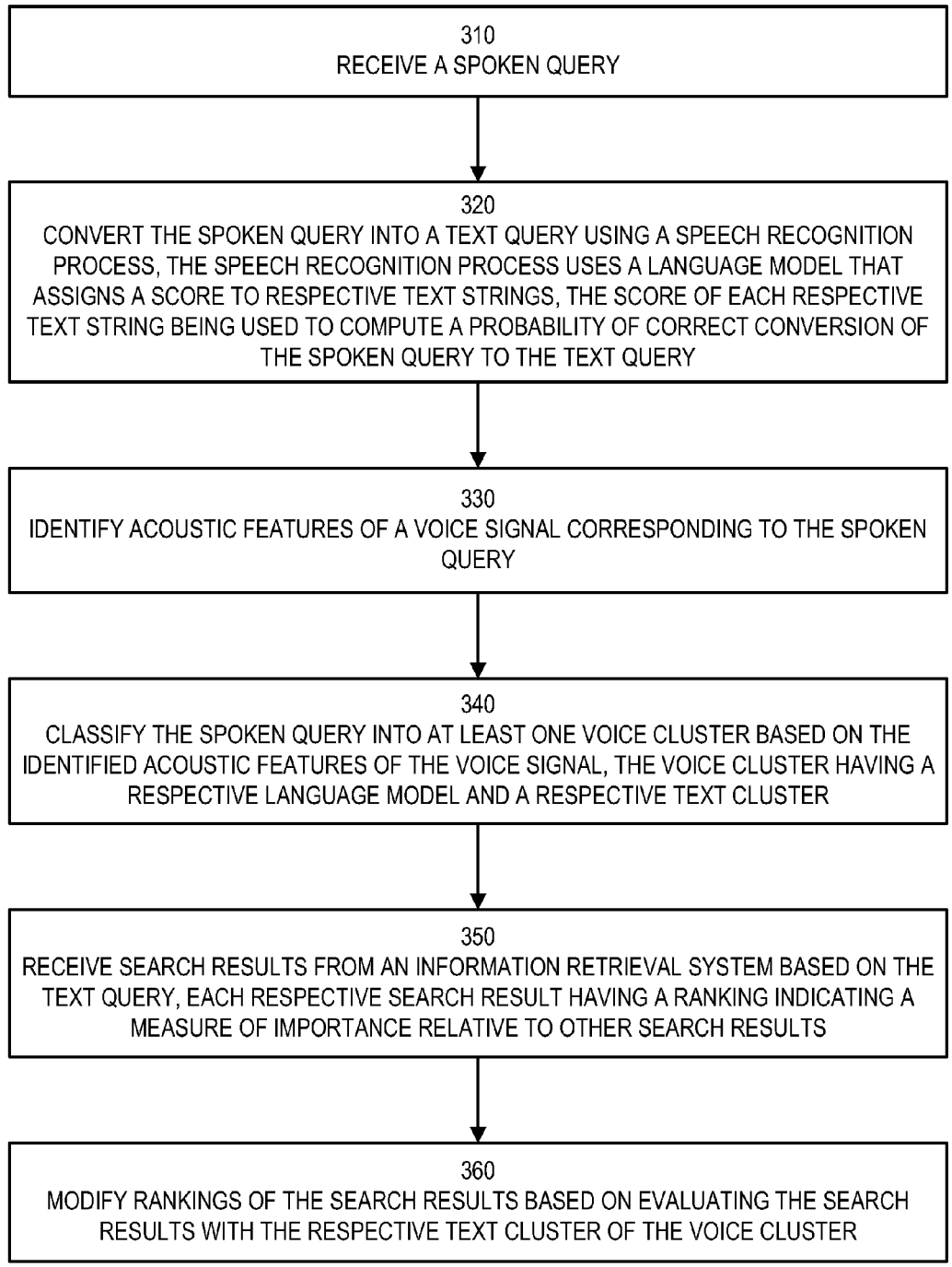
FIG. 3 is a flowchart illustrating an example of a process supporting a voice search manager according to embodiments herein.

Now describing embodiments more specifically, FIG. 3 is a flow chart illustrating embodiments disclosed herein. In step 310, the voice search manager receives a spoken query. The voice search manager can be, for example, a software application being executed on a mobile or client device. Alternatively, the voice search manager can operate on a remote server, or the voice search manager can be distributed across a client device and remote server for processing operations. The spoken voice query is a spoken utterance to be used with an information retrieval system, and can be spoken by any user such as a user of a mobile telephone or other portable electronic device, a desktop computer user, a machine or vehicle operator, and so forth.

In step 320, the voice search manager converts the spoken query into a text query using a speech recognition process. The speech recognition process uses a statistical language model that assigns a score to respective text strings. Alternatively, the speech recognition process uses an acoustic model in additional to the statistical language model to assign probabilities to respective text strings/word sequences. Language model information can then be combined with acoustic score information to produce a combined score for each respective text string. Generally, embodiments that score with a combination of acoustic evidence and language model probabilities yield better confidences scores. The score of each respective text string (whether language model scoring alone or combined acoustic and language model scoring) indicates a probability of a word string occurring, and can be used to compute a probability of correct conversion of the spoken query to the text query. Thus, the probability of a given word string occurring can be used to compute a confidence level. In other words, the speech recognition process analyzes phonetics and/or acoustic elements from the spoken query to identify a probable word, words, or characters from the spoken query to create a textual representation. By way of a specific example, if the spoken query were "Five star restaurants in Boston," (as heard by a listener) then the speech recognition process would analyze the spoken query or audio file of the spoken query to yield the text: "Five star restaurants in Boston."

In step 330, the voice search manager identifies acoustic features of a voice signal corresponding to the spoken query. That is, the voice search manager identifies features such as pitch, frequency, volume, or features of an audio wave form of the spoken query, other than identifying words from the spoken query.

In step 340, the voice search manager classifies the spoken query into at least one voice cluster based on the identified acoustic features of the voice signal. The voice cluster has a respective language model and a respective text cluster. Thus, based on the identified acoustic features, the voice search manager can match the spoken query with a voice cluster or voice group having similar acoustic features.

In step 350, the voice search manager receives search results from an information retrieval system based on the text query. Each respective search result has a ranking indicating a measure of importance relative to other search results. In other words, the voice search manager, or associated system, runs the text query through an information retrieval system. As a specific example, the voice search manager submits the text query to a search engine to retrieve search results. The results can either be returned in an order of relevance, such as with the most relevant results at a first of a list, or the results can include metadata with values indicating relative importance based on the text query.

In step 360, the voice search manager modifies rankings of the search results based on evaluating the search results with the respective text cluster of the voice cluster. In this step, the voice search manager can compare the ranked search results (ranked by the search engine) with a corpus of text or documents that has already been determined to be relevant or commonly used with users having acoustic voice features of the identified voice cluster. The voice search manager can use various techniques for evaluating the ranked search results. For example, the voice search manager can use a vector space model or term vector model, which can use term frequency-inverse document frequency (TF-IDF) weights to evaluate how important a word is in a document. TF-IDF can be used to vector initial query results from the text query ranking list, and then compute the similarity between every vector and text information in the audio clusters. Similarity can then be used as one feature to re-rank the ranking list of search results.

Figure 4:
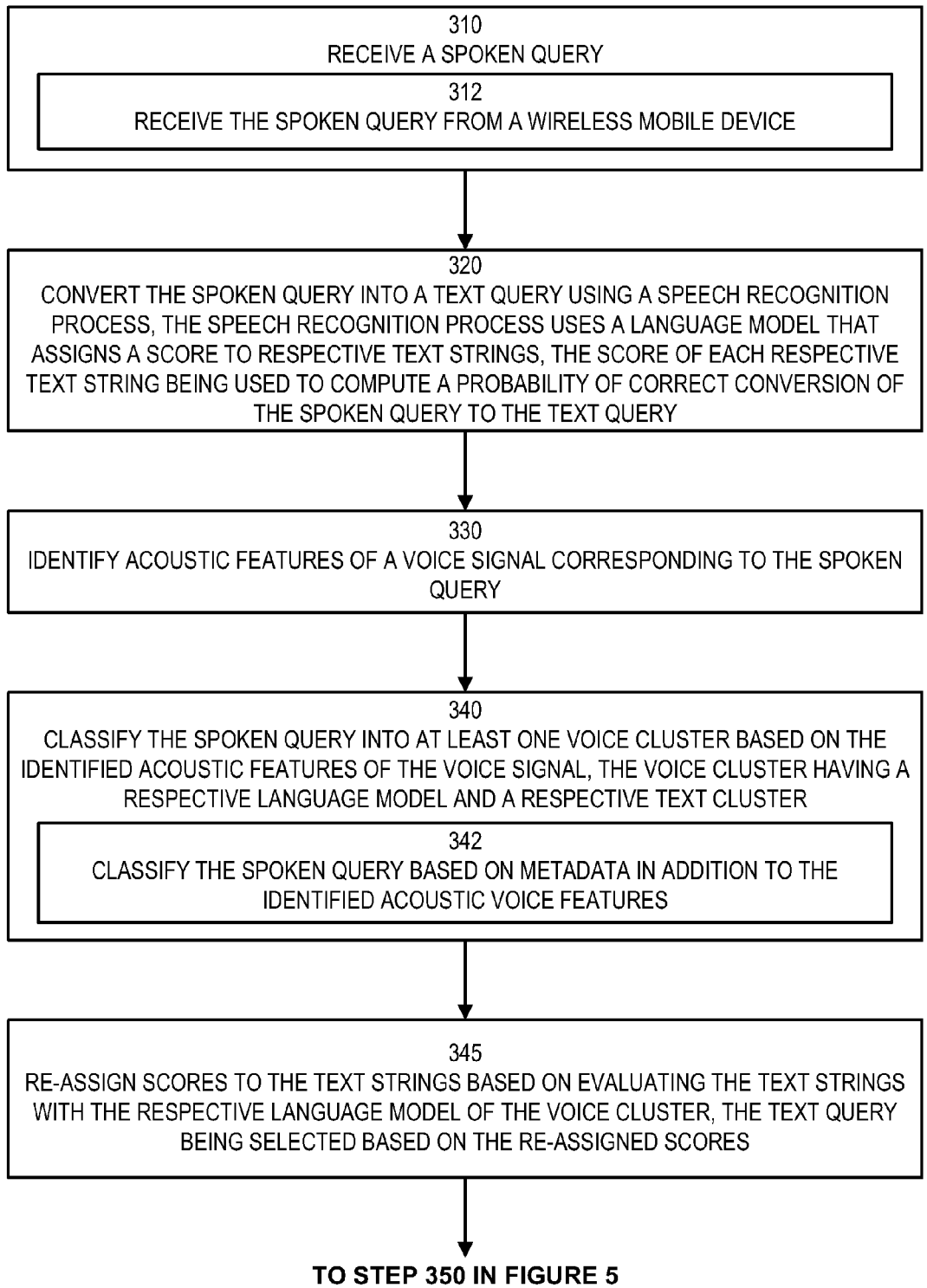
FIGS. 4-5 are a flowchart illustrating an example of a process supporting a voice search manager according to embodiments herein.
Figure 5:
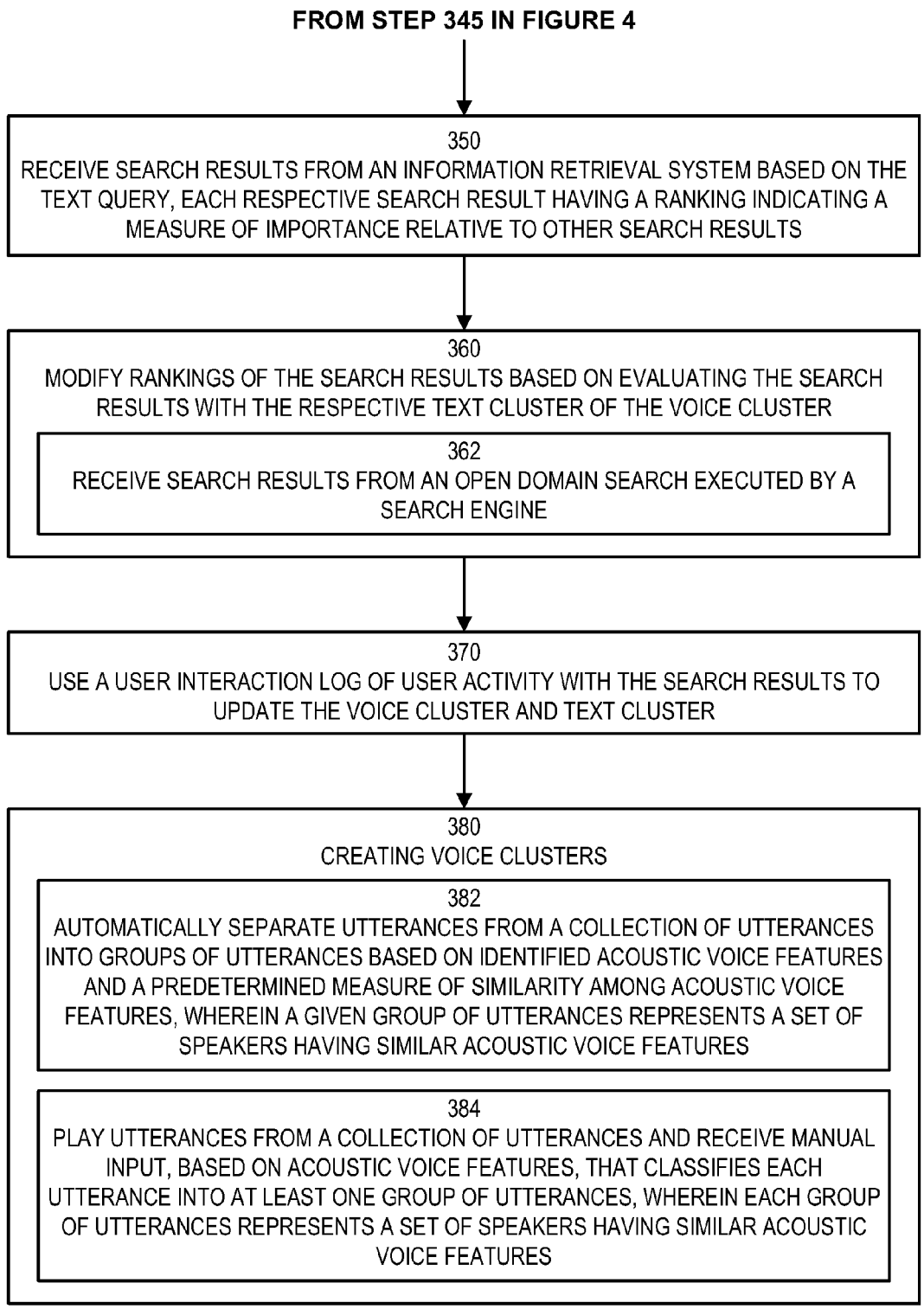

FIGS. 4-5 include a flow chart illustrating additional and/or alternative embodiments and optional functionality of the voice search manager 140 as disclosed herein.

In step 310, the voice search manager receives a spoken query.

In step 312, the voice search manager receives the spoken query from a wireless mobile device, cell phone, laptop computer, etc.

In step 320, the voice search manager converts the spoken query into a text query using a speech recognition process. The speech recognition process uses a language model (alternatively in combination with an acoustic model) that assigns a score to respective text strings, with the score of each respective text string being used to compute a probability of correct conversion of the spoken query to the text query.

In step 330, the voice search manager identifies acoustic features of a voice signal corresponding to the spoken query.

In step 340, the voice search manager classifies the spoken query into at least one voice cluster based on the identified acoustic features of the voice signal, with the voice cluster having a respective language model and a respective text cluster.

In step 342, the voice search manager classifies the spoken query based on metadata in addition to the identified acoustic voice features. Metadata can include any additional information associated with the spoken query, a speaker of the spoken query, or an electronic device used by the speaker for executing the voice-enabled search. This can include hardware and software data of the electronic device, profile information of the speaker, location information, etc.

In step 345, the voice search manager re-assigns scores to the text strings based on evaluating the text strings with the respective language model of the voice cluster. The text query, that is the text query selected to submit to the search engine, can be selected based on the re-assigned scores. This step relates to the speech recognition step, and can enhance the speech recognition results. Thus, while the speech recognition process is being executed, the voice search manager separately or simultaneously extracts acoustic voice features to match the speaker with a voice cluster. A statistical language model associated with the speaker/spoken query can then be used to process the initial probable text strings of the speech recognition process to further enhance the speech recognition results. The result of this step may be a modified text query, different text query, or the same text query as initially identified by the speech recognition process.

In step 350, the voice search manager receives search results from an information retrieval system based on the text query, with each respective search result having a ranking indicating a measure of importance relative to other search results.

In step 360, the voice search manager modifies rankings of the search results based on evaluating the search results with the respective text cluster of the voice cluster.

In step 362, the voice search manager receives search results from an open-domain search executed by a search engine. For example, the search executed is not restricted to a particular directory or narrowed database, but is executed within the larger information space.

In step 370, the voice search manager uses a user interaction log of user activity with the search results to update the voice cluster and text cluster. The voice search manager can continually and incrementally improve voice and text cluster by adding additional data accessed by users associated with a particular voice cluster.

In step 380, the voice search manager creates voice clusters. This can be a step executed prior to an initial voice-enabled search, but involves creating a set of voice clusters and associated text clusters. The set could number just a few voice clusters to hundreds or thousands of voice clusters.

In step 382, the voice search manager accesses utterances from a collection of utterances. This collection could be a set of recorded queries of user or callers. The voice search manager then automatically separates utterances into groups of utterances based on identified acoustic voice features and a predetermined measure of similarity among acoustic voice features, such that a given group of utterances represents a set of speakers having similar acoustic voice features. For example, an electronic system analyzes audio wave forms of various queries/speakers, then identifies differences and similarities, and groups queries having similar wave form features. Then the system, for each group of utterances, can create a statistical language model specific to a respective group of utterances.

In step 384, the system can play utterances from a collection of utterances to a user via a user interface. A user can then listen to and evaluate the utterances to identify voice features independent of the specific words uttered. The voice search manager then receives manual input (such as by a person), based on acoustic voice features, that classifies each utterance into at least one group of utterances, with or without labeling the groups. The manual input can be via a graphical user interface or via voice command, for example.

Each group of utterances then represents a set of speakers having similar acoustic voice features.

Continuing with FIG. 6, the following discussion provides a basic embodiment indicating how to carry out functionality associated with the voice search manager 140 as discussed above. It should be noted, however, that the actual configuration for carrying out the voice search manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the voice search manager 140 of computer system 149 to communicate over a network and, if necessary, retrieve any data required to create views, process content, communicate with a user, etc. according to embodiments herein.

As shown, memory system 141 is encoded with voice search manager 140-1 that supports functionality as discussed above and as discussed further below. Voice search manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the voice search manager 140-1. Execution of the voice search manager 140-1 produces processing functionality in voice search manager process 140-2. In other words, the voice search manager process 140-2 represents one or more portions of the voice search manager 140 performing within or upon the processor 142 in the computer system 149.

It should be noted that, in addition to the voice search manager process 140-2 that carries out method operations as discussed herein, other embodiments herein include the voice search manager 140-1 itself (i.e., the un-executed or non-performing logic instructions and/or data). The voice search manager 140-1 may be stored on a non-transitory, tangible computer-readable storage medium including computer readable storage media such as floppy disk, hard disk, optical medium, etc. According to other embodiments, the voice search manager 140-1 can also be stored in a memory type system such as in firmware, read only memory (ROM), or, as in this example, as executable code within the memory system 141.

In addition to these embodiments, it should also be noted that other embodiments herein include the execution of the voice search manager 140-1 in processor 142 as the voice search manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
classifying, by a computing device, speech into at least one voice cluster based on identified acoustic features of the speech, the at least one voice cluster corresponding to a text cluster and a customized language model that reflects characteristics of a speaker of the speech;
determining, by the computing device, a text query based on the customized language model and one or more text strings determined based on the speech;
receiving, by the computing device, search results based on the text query, each of the search results having a ranking indicating a measure of importance relative to other of the search results; and
re-ranking, by the computing device, the search results based on re-scoring the search results using the text cluster;
receiving a user interaction log comprising click data associated with a user interaction with the re-ranked search results;
updating the at least one voice cluster based on the user interaction with the re-ranked search results; and
updating the customized language model based on the click data associated with the user interaction with the re-ranked search results.

2. The method of claim 1, comprising:
re-assigning scores to the one or more text strings based on evaluating the one or more text strings using the customized language model.

3. The method of claim 1, comprising:
receiving, by the computing device, the speech;
converting, by the computing device, the speech into the one or more text strings using a speech recognition process; and
determining, using an initial language model, a score for each of the one or more text strings, the score of each of the one or more text strings being used to compute a probability of correct conversion of the speech into the one or more text strings.

4. The method of claim 1, comprising:
receiving metadata that corresponds to the speech,
wherein classifying the speech into the at least one voice cluster based on the identified acoustic features of the speech comprises classifying the speech into the at least one voice cluster based on the identified acoustic features of the speech and the metadata that corresponds to the speech.

5. The method of claim 4, wherein the metadata that corresponds to the speech comprises at least one of a time of day when the speech was captured, a telephone number associated with a telephone that captured the speech, model information of a mobile device that captured the speech, hardware information of the mobile device that captured the speech, or profile information of a profile of the speaker of the speech on the mobile device that captured the speech.

6. The method of claim 5, comprising:
receiving previous spoken queries requested by the telephone associated with the telephone number; and
modifying rankings of the search results based on the previous spoken queries.

7. The method of claim 5, wherein the metadata that corresponds to the speech comprises an area code of the telephone number of the telephone that captured the speech, and wherein the method comprises:
using the area code to determine regional word choices and interests; and
modifying rankings of the search results based on the regional word choices and interests.

8. The method of claim 4, wherein the metadata comprises a location of a mobile device that captured the speech, wherein the location of the mobile device comprises a location of a moving vehicle.

9. The method of claim 1, wherein classifying the speech into the at least one voice cluster based on the identified acoustic features of the speech comprises determining that the identified acoustic features are associated with one of an age of the speaker or an accent of a geographic region.

10. The method of claim 1, comprising:
receiving the speech from a wireless mobile device,
wherein receiving the search results based on the text query comprises receiving the search results from an open domain search executed by a search engine based on the one or more text strings.

11. Non-transitory computer-readable media storing executable instructions that, when executed by one or more processors, cause a system to:
classify speech into at least one voice cluster based on identified acoustic features of the speech, the at least one voice cluster corresponding to a text cluster and a customized language model that reflects characteristics of a speaker of the speech;
determine a text query based on the customized language model and one or more text strings determined based on the speech;
receive search results based on the text query, each of the search results having a ranking indicating a measure of importance relative to other of the search results;
re-rank the search results based on re-scoring the search results using the text cluster;
receive a user interaction log comprising click data associated with a user interaction with the re-ranked search results;
update the at least one voice cluster based on the user interaction with the re-ranked search results; and
update the customized language model based on the click data associated with the user interaction with the re-ranked search results.

12. A system comprising:
one or more processors; and
non-transitory memory storing executable instructions that, when executed by the one or more processors, cause the system to:
classify speech into at least one voice cluster based on identified acoustic features of the speech, the at least one voice cluster corresponding to a text cluster and a customized language model that reflects characteristics of a speaker of the speech;
determine a text query based on the customized language model and one or more text strings determined based on the speech;
receive search results based on the text query, each of the search results having a ranking indicating a measure of importance relative to other of the search results;
re-rank the search results based on re-scoring the search results using the text cluster;
receive a user interaction log comprising click data associated with a user interaction with the re-rank search results;
update the at least one voice cluster based on the user interaction with the re-ranked search results; and
update the customized language model based on the click data associated with the user interaction with the re-ranked search results.

13. The system of claim 12, wherein the non-transitory memory stores further executable instructions that, when executed by the one or more processors, cause the system to:
re-assign scores to the one or more text strings based on evaluating the one or more text strings using the customized language model.

14. The system of claim 12, wherein the non-transitory memory stores further executable instructions that, when executed by the one or more processors, cause the system to:
receive metadata that corresponds to the speech,
wherein classifying the speech into the at least one voice cluster based on the identified acoustic features of the speech comprises classifying the speech into the at least one voice cluster based on the identified acoustic features of the speech and the metadata that corresponds to the speech.

15. The non-transitory computer-readable media of claim 11, storing further executable instructions that, when executed by the one or more processors, cause the system to:
re-assign scores to the one or more text strings based on evaluating the one or more text strings using the customized language model.

16. The non-transitory computer-readable media of claim 11, storing further executable instructions that, when executed by the one or more processors, cause the system to:
receive metadata that corresponds to the speech,
wherein classifying the speech into the at least one voice cluster based on the identified acoustic features of the speech comprises classifying the speech into the at least one voice cluster based on the identified acoustic features of the speech and the metadata that corresponds to the speech.

* * * * *